US011005553B2

(12) United States Patent
Nilsson

(10) Patent No.: US 11,005,553 B2
(45) Date of Patent: May 11, 2021

(54) BEAM TRAINING PERFORMED BY A TERMINAL DEVICE

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 5 days.

(21) Appl. No.: 16/461,260

(22) PCT Filed: Aug. 22, 2018

(86) PCT No.: PCT/EP2018/072610
§ 371 (c)(1),
(2) Date: May 15, 2019

(87) PCT Pub. No.: WO2020/038569
PCT Pub. Date: Feb. 27, 2020

(65) Prior Publication Data
US 2020/0274605 A1    Aug. 27, 2020

(51) Int. Cl.
*H04B 7/06*    (2006.01)
(52) U.S. Cl.
CPC ................. *H04B 7/0695* (2013.01)
(58) Field of Classification Search
CPC .... H04B 7/0695; H04B 7/088; H04B 7/0617; H04W 16/28
See application file for complete search history.

(56) References Cited

U.S. PATENT DOCUMENTS

| 2018/0048375 | A1  | 2/2018  | Guo et al. |
| 2018/0083680 | A1* | 3/2018  | Guo ..................... H04B 7/0626 |
| 2019/0174423 | A1* | 6/2019  | Zhang ................ H04W 52/241 |
| 2019/0349960 | A1* | 11/2019 | Li ..................... H04W 72/1242 |

OTHER PUBLICATIONS

International Search Report and Written Opinion dated Mar. 26, 2019 issued in International Application No. PCT/EP2018/072610. (15 pages).

\* cited by examiner

*Primary Examiner* — Lakeram Jangbahadur
(74) *Attorney, Agent, or Firm* — Rothwell, Figg, Ernst & Manbeck, P.C.

(57) ABSTRACT

There is provided mechanisms for beam training, the method being performed by a terminal device. A method comprises receiving, using a fixed beam b0 and from a network node, a first occurrence of a set of beam reference signals r1, r2, ..., rk, ..., rN. The method comprises determining a respective compensation factor c1, c2, ..., ck, ..., cN for at least one of the received beam reference signals r1, r2, ..., rk, ..., rN. The method comprises receiving, using a set of directional beams b1, b2, ..., bk, ..., bN and from the network node, a second occurrence of the set of beam reference signals r1, r2, ..., rk, ..., rN such that beam reference signal rk is received in directional beam bk, for k=1, ..., N. The method comprises evaluating which directional beam in the set of directional beams b1, b2, ..., bk, ..., bN to use for subsequent communication with the network node based on strongest received beam reference signal in the second occurrence of the set of beam reference signals r1, r2, ..., rk, ..., rN as compensated for using the compensation factors ck, for k=1, ..., N, wherein signal strength for directional beam bk is compensated for using compensation factor ck, for k=1, ..., N.

25 Claims, 6 Drawing Sheets

BEAM TRAINING PERFORMED BY A TERMINAL DEVICE

CROSS REFERENCE TO RELATED APPLICATION(S)

This application is a 35 U.S.C. § 371 National Stage of International Patent Application No. PCT/EP2018/072610, filed Aug. 22, 2018, designating the United States.

TECHNICAL FIELD

Embodiments presented herein relate to a method, a terminal device, a computer program, and a computer program product for beam training.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam.

Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

FIG. 1 schematically illustrates time/frequency resources for transmitting one the SSB (where PRB is short for Physical resource Block). Each SSB consist of four orthogonal frequency-division multiplexing (OFDM) symbols, in FIG. 1 denoted OFDM symb 1, OFDM symb 2, OFDM symb 3, and OFDM symb 4. Time/frequency resources for a Primary Synchronization Signal (PSS) are located in the first OFDM symbol and are used for finding a coarse time/frequency synchronization. Time/frequency resources for a Physical Broadcast Channel (PBCH) are located in the second, third and fourth OFDM symbol and contain necessary system information bits. Time/frequency resources for a Secondary Synchronization Signal (SSS) are located in the second OFDM symbol and are used for establishing a finer time/frequency synchronization.

In order for the terminal device to obtain initial access to the TRP the TRP transmits an SSB and broadcasted system information. During initial access the terminal device can measure received power for respective SSB (in case the TRP uses multiple beamformed SSB) and in this way determine a preferred TRP TX SSB beam. The terminal device responds by transmitting a Physical Random Access Channel (PRACH) sequence to the TRP. When the terminal device signals the PRACH to the TRP the PRACH sequence will be determined based on the best received SSB. In this way the TRP implicitly finds out which TX beam on which the SSB was transmitted that was best for that terminal device. The terminal device then expects the TRP to continue to transmit control and/or data signals in that preferred TRP TX beam until other instructions are given.

Some terminal devices operating at such higher frequencies will use analog beamforming. During initial access, before the terminal device has any spatial information about where the TRP is located, it is expected that the terminal device will use a wide beam to achieve as omni-directional coverage as possible. After the initial access, it might be preferred that the terminal device finds a narrower RX beam in order to increase the path gain. One way to achieve this is to let the TRP initiate a RX beam sweep procedure at the terminal device based on CSI-RS, which basically means that the TRP transmits a burst of CSI-RS in a fixed TX beam such that the terminal device is enabled sweep through different RX beams, measure the received power in each RX beam and select the beam with highest received power. One Issue with this approach is that extra overhead signaling is needed, hence resulting in extra time/frequency resources being required to be dedicated for beam training purposes.

Hence, there is still a need for improved beam training requiring less overhead signaling.

SUMMARY

An object of embodiments herein is to enable efficient beam training, where the above noted issues are resolved, or at least mitigated or reduced.

According to a first aspect there is presented a method for beam training, the method being performed by a terminal device. The method comprises receiving, using a fixed beam b0 and from a network node, a first occurrence of a set of beam reference signals r1, r2, ..., rk, ..., rN. The method comprises determining a respective compensation factor c1, c2, ..., ck, ..., cN for at least one of the received beam reference signals r1, r2, ..., rk, ..., rN. The method comprises receiving, using a set of directional beams b1, b2, ..., bk, ..., bN and from the network node, a second occurrence of the set of beam reference signals r1, r2, ..., rk, ..., rN such that beam reference signal rk is received in directional beam bk, for k=1, ..., N. The method comprises evaluating which directional beam in the set of directional beams b1, b2, ..., bk, ..., bN to use for subsequent communication with the network node based on strongest received beam reference signal in the second occurrence of the set of beam reference signals r1, r2, ..., rk, ..., rN as compensated for using the compensation factors ck, for k=1, ..., N, wherein signal strength for directional beam bk is compensated for using compensation factor ck, for k=1, ..., N.

According to a second aspect there is presented a terminal device for beam training. The terminal device comprises processing circuitry. The processing circuitry is configured to cause the terminal device to receive, using a fixed beam b0 and from a network node, a first occurrence of a set of beam reference signals r1, r2, ..., rk, ..., rN. The processing circuitry is configured to cause the terminal device to determine a respective compensation factor c1, c2, ..., ck, ..., cN for at least one of the received beam reference signals r1, r2, ..., rk, ..., rN. The processing circuitry is configured to cause the terminal device to receive, using a set of directional beams b1, b2, ..., bk, ..., bN and from the network node, a second occurrence of the set of beam reference signals r1, r2, ..., rk, ..., rN such that beam reference signal rk is received in directional beam bk, for k=1, ..., N. The processing circuitry is configured to cause the terminal device to evaluate which directional beam in the set of directional beams b1, b2, ..., bk, ..., bN to use for subsequent communication with the network node based on strongest received beam reference signal in the second occurrence of the set of beam reference signals r1, r2, ..., rk, ..., rN as compensated for using the compensation factors ck, for k=1, ..., N, wherein signal strength for directional beam bk is compensated for using compensation factor ck, for k=1, ..., N.

According to a third aspect there is presented a terminal device for beam training. The terminal device comprises a receive module configured to receive, using a fixed beam b0 and from a network node, a first occurrence of a set of beam reference signals r1, r2, ..., rk, ..., rN. The terminal device comprises a determine module configured to determine a respective compensation factor c1, c2, ..., ck, ..., cN for at least one of the received beam reference signals r1, r2, ..., rk, ..., rN. The terminal device comprises a receive module configured to receive, using a set of directional beams b1, b2, ..., bk, ..., bN and from the network node, a second occurrence of the set of beam reference signals r1, r2, ..., rk, ..., rN such that beam reference signal rk is received in directional beam bk, for k=1, ..., N. The terminal device comprises an evaluate module configured to evaluate which directional beam in the set of directional beams b1, b2, ..., bk, ..., bN to use for subsequent communication with the network node based on strongest received beam reference signal in the second occurrence of the set of beam reference signals r1, r2, ..., rk, ..., rN as compensated for using the compensation factors ck, for k=1, ..., N, wherein signal strength for directional beam bk is compensated for using compensation factor ck, for k=1, ..., N.

According to a fourth aspect there is presented a computer program for beam training, the computer program comprising computer program code which, when run on a terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient beam training for the terminal device.

Advantageously, the proposed beam training does not suffer from the above noted issues.

Advantageously, by means of the proposed beam training an SSB can be used for RX beam training at the terminal device, enabling the terminal device to perform accurate received power estimates for different OFDM symbols in which the SSB is located, which will improve the accuracy of the RX beam selection at the terminal device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
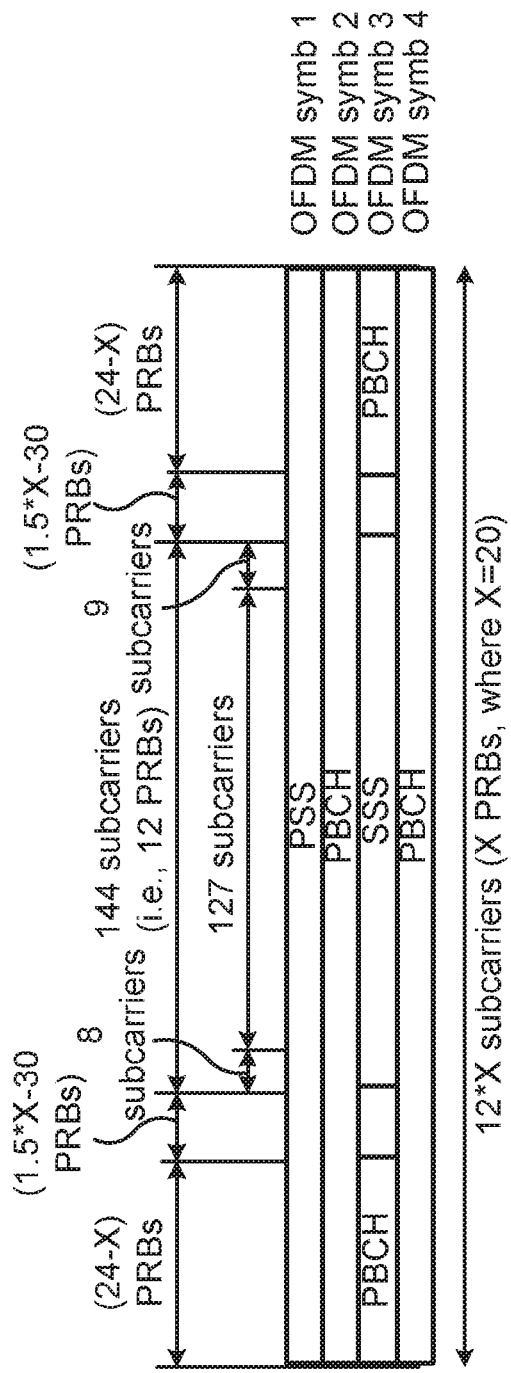
FIG. 1 schematically illustrates time/frequency resources for one SSB.
Figure 2:
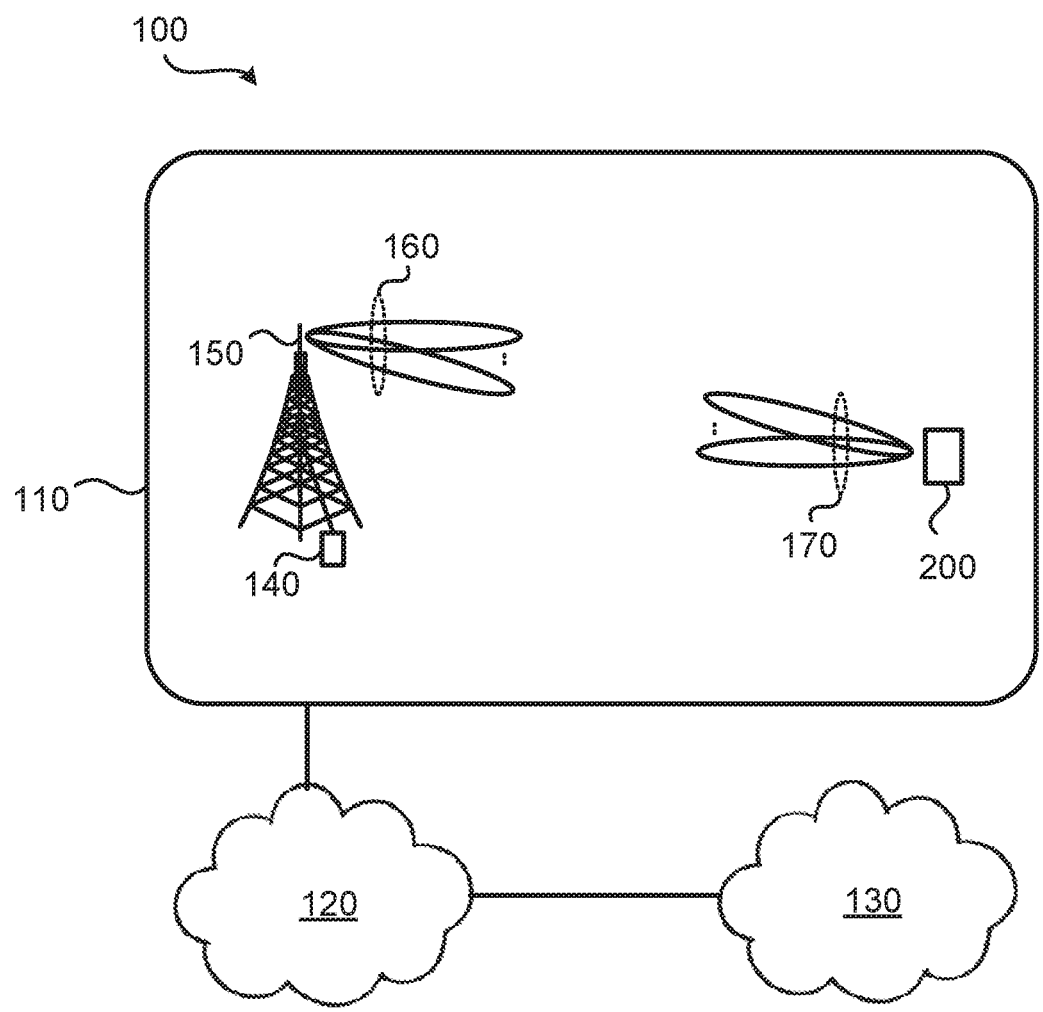
FIG. 2 is a schematic diagram illustrating a communications network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network node 140 configured to provide network access to at least one terminal device 200 in a radio access network 110. The radio access network 110 is operatively connected to a core network 120. The core network 120 is in turn operatively connected to a service network 130, such as the Internet. The terminal device 200 is thereby enabled to, via the network node 140, access services of, and exchange data with, the service network 130.

Examples of network nodes 140 are radio access network nodes, radio base stations, base transceiver stations, Node Bs, evolved Node Bs, g Node Bs, access points, and access nodes, and backhaul nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 140 comprises, is collocated with, is integrated with, or is in operational communications with, a TRP, 150.

The network node 140 (via its TRP 150) and the terminal device 20 are be configured to communicate with each other in respective sets of beams 160, 170.

As disclosed above a beam management procedure involving beam training at the terminal device 200 can be used to establish a BPL comprising one of the beams 160 and one of the beams 170. Issues with existing beam training procedures have been noted above.

An alternative way for the terminal device 200 to adjust its receive beam, without extra overhead signaling, is to configure the terminal device 200 to evaluate different reception beam during the periodic SSB transmission after initial access of the terminal device 200. Since each SSB consists of four signals, a maximum of four reception beams can be evaluated during each SSB transmission. However there might be some potential issues with this type of procedure in case of different power boosting for different signals.

In further detail, performing the beam training procedures on the multiple signals in an SSB could yield wrong estimations of received power since the different signals within one SSB span different frequency parts, and can be transmitted with different output power. This might lead to the wrong beam being selected at the terminal device 200 and hence reduce performance.

The embodiments disclosed herein therefore relate to mechanisms for beam training. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 3:
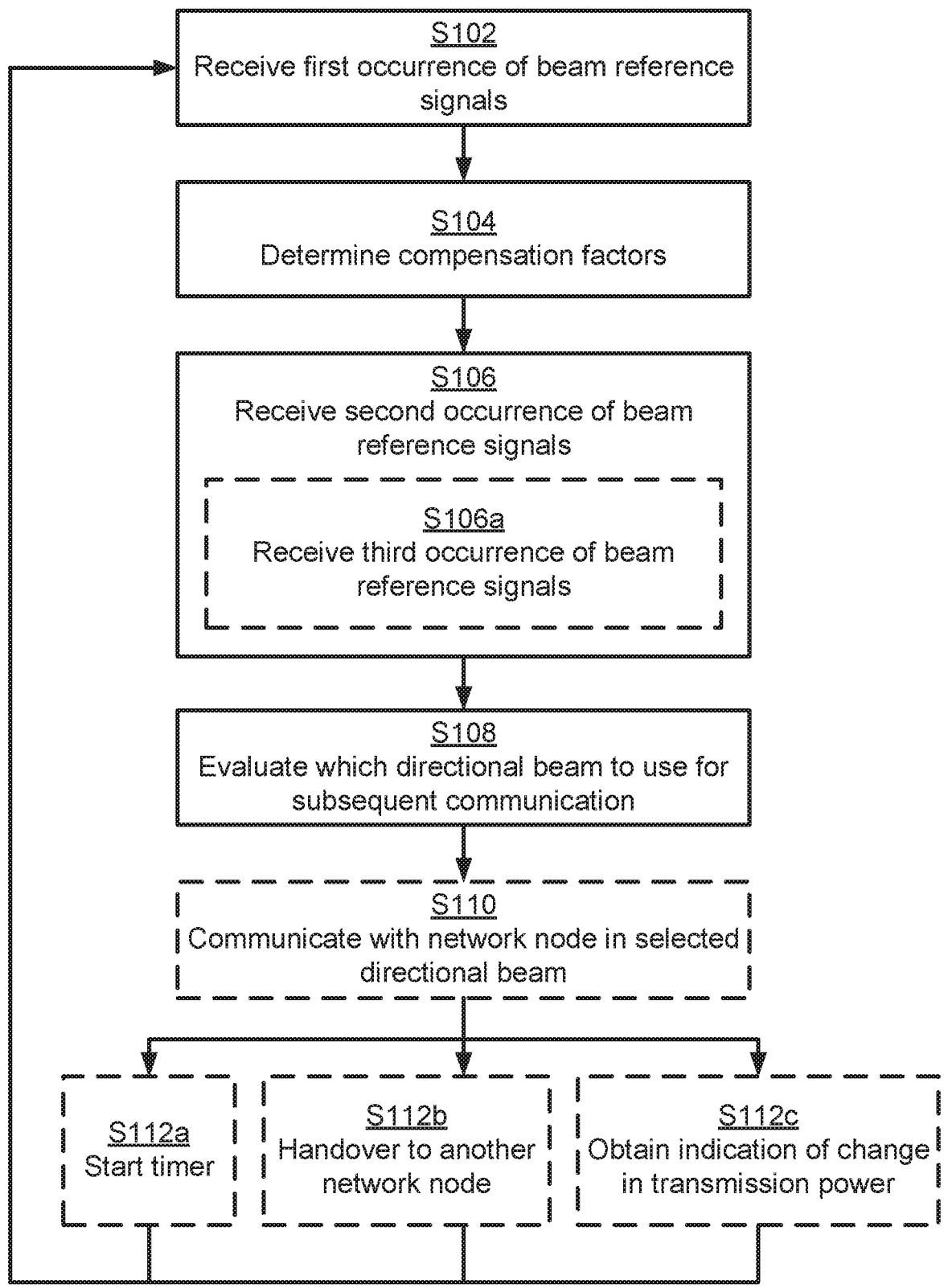
FIG. 3 is a flowchart of methods according to embodiments.

FIG. 3 is a flowchart illustrating embodiments of methods for beam training. The methods are performed by the terminal device 200. The methods are advantageously provided as computer programs 820.

It is assumed that the terminal device 200 needs to perform beam training. Examples of reasons for the terminal device 200 to perform beam training will be disclosed below. The beam training is based on beam reference signals $r1, r2, \ldots, rk, \ldots, rN$ as transmitted by the network node 140 and received by the terminal device 200. Hence, the terminal device 200 is configured to perform step S102:

S102: The terminal device 200 receives a first occurrence of a set of beam reference signals $r1, r2, \ldots, rk, \ldots, rN$. The first occurrence of the set of beam reference signals $r1, r2, \ldots, rk, \ldots, rN$ is received by the terminal device 200 using a fixed beam b0. The first occurrence of the set of beam reference signals $r1, r2, \ldots, rk, \ldots, rN$ is received by the terminal device 200 from the network node 140.

Instead of using raw measurements of the received beam reference signals the terminal device 200 is configured to use compensated measurements of the beam reference signals. The terminal device 200 is therefore configured to perform step S104:

S104: The terminal device 200 determines a respective compensation factor $c1, c2, \ldots, ck, \ldots, cN$ for at least one of the received beam reference signals $r1, r2, \ldots, rk, \ldots, rN$.

In this respect, the "at least one of the received beam reference signals" could range from one single of the received beam reference signal to all (or at least all but one) of the received beam reference signals.

The terminal device 200 then uses directional beams when receiving the beam reference signals. Particularly, the terminal device 200 is configured to perform step S106:

S106: The terminal device 200 receives, using a set of directional beams $b1, b2, \ldots, bk, \ldots, bN$ and from the network node 140, a second occurrence of the set of beam reference signals $r1, r2, \ldots, rk, \ldots, rN$. The set of directional beams $b1, b2, \ldots, bk, \ldots, bN$ are used such that beam reference signal $rk$ is received in directional beam $bk$, for $k=1, \ldots, N$.

The compensation factors are then used by the terminal device 200 when determined which of the beam reference signals was received with highest signal strength. Particularly, the terminal device 200 is configured to perform step S108:

S108: The terminal device 200 evaluates which directional beam in the set of directional beams $b1, b2, \ldots, bk, \ldots, bN$ to use for subsequent communication with the network node 140. The evaluation is based on the strongest received beam reference signal in the second occurrence of the set of beam reference signals $r1, r2, \ldots, rk, \ldots, rN$ as compensated for using the compensation factors $ck$, for $k=1, \ldots, N$. The signal strength for directional beam $bk$ is compensated for using compensation factor $ck$, for $k=1, \ldots, N$.

Thereby, using a fixed RX beam, as defined by fixed beam b0, at the terminal device 200 when receiving the first occurrence of the set of beam reference signals $r1, r2, \ldots, rk, \ldots, rN$ and calculating received power for these beam reference signals $r1, r2, \ldots, rk, \ldots, rN$, the terminal device 200 is enabled to find compensation factors for the respective beam reference signals $r1, r2, \ldots, rk, \ldots, rN$, as received in directional beams $b1, b2, \ldots, bk, \ldots, bN$, that compensate away potential differences in output power and/or frequency allocation between the different beam reference signals $r1, r2, \ldots, rk, \ldots, rN$. The terminal device 200 then uses these compensation factors when performing a RX beam sweep on the second occurrence of the set of beam reference signals $r1, r2, \ldots, rk, \ldots, rN$ in order to get fair comparison of received power estimates for the different RX beams.

Embodiments relating to further details of beam training as performed by the terminal device 200 will now be disclosed.

There could be different ways for the terminal device 200 to receive the beam reference signals. For example, the terminal device 200 could receive the beam reference signals using analog beamforming, digital beamforming, or hybrid beamforming. According to an embodiment the beam reference signals are received using analog beamforming at the terminal device 200. Using analog beamforming is generally simpler and less costly, in terms of hardware requirements, than digital beamforming and hybrid beamforming.

There could be different types of beam reference signals $r1, r2, \ldots, rk, \ldots, rN$ and ways in which the beam reference signals $r1, r2, \ldots, rk, \ldots, rN$ are transmitted.

According to an embodiment each beam reference signal $r1, r2, \ldots, rk, \ldots, rN$ timewise occupies one OFDM symbol. However, not the whole OFDM symbol needs to be occupied (i.e., occupied by the beam reference signals) in the frequency dimension.

According to an embodiment the set of beam reference signals $r1, r2, \ldots, rk, \ldots, rN$ is periodically received by the terminal device 200.

According to an embodiment the set of beam reference signals $r1, r2, \ldots, rk, \ldots, rN$ is defined by a synchronization signal block (SSB). Hence, the terminal device 200 could perform measurements on an SSB that is periodically transmitted by the network node 140.

There could be different types of SSB. According to an embodiment the set of beam reference signals $r1, r2, \ldots, rk, \ldots, rN$ comprises four beam reference signals, such that N=4. This enables existing SSB:s to be used for beam training purposes.

There could be different ways for the terminal device 200 to determine which signal is the strongest received signal. According to an embodiment the strongest received signal is determined in terms of reference signal received power (RSRP).

There could be different parts of the beam reference signals for which the RSRP is determined. According to an embodiment each of the beam reference signals $r1, r2, \ldots, rk, \ldots, rN$ comprises a secondary synchronization signal (SSS) and the RSRP is determined for the SSS. This could then be the case where the SSS are part of the SSB.

Further, for any signal received from the network node 140 that contains a PBCH, at least the resource elements used for Demodulation Reference Signals (DMRS) that are used for PBCH demodulation can be used to calculate the RSRP. For PSS and SSS all allocated resource elements can be used for RSRP calculation.

There could be different ways for the terminal device 200 to perform the beam training. Aspects relating thereto will now be disclosed.

One aspects relating to the beam training concerns the type of beams $b0, b1, b2, \ldots, bk, \ldots, bN$ used. For example, a broad fixed beam $b0$ could be used before narrow directional beams $b1, b2, \ldots, bk, \ldots, bN$ are used. According to an embodiment the fixed beam $b0$ is wider that the directional beams $b1, b2, \ldots, bk, \ldots, bN$. For example, the fixed beam $b0$ could be a wide beam and be as omni-directional as possible. According to an embodiment each of the directional beams $b1, b2, \ldots, bk, \ldots, bN$ has a narrower beam width than the fixed beam $b0$. For example, the directional beams $b1, b2, \ldots, bk, \ldots, bN$ could be so-called pen-shaped narrow beams.

One aspect relating to the beam training concerns the criterion according to which the beam training is triggered. There could be different triggers for the terminal device 200 to perform the beam training.

One trigger is initial access. According to an embodiment the beam training is performed as part of an initial access performed by the terminal device 200 to the network node 140. The terminal device 200 during this initial access procedure could therefore measures and store the received power (e.g., per OFDM symbol) for e.g. the strongest SSB. Alternatively, the terminal device 200 could measure and store the received power (e.g., per OFDM symbol) based on the average of the M strongest SSBs.

Another trigger is handover. According to an embodiment the beam training is performed with a network node 140 to which the terminal device 200 has been handed over to. Aspects of when to trigger determination of new values of the compensation factors $c1, c2, \ldots, ck, \ldots, cN$ will be disclosed below.

Aspects of the compensation factors $c1, c2, \ldots, ck, \ldots, cN$ will now be disclosed.

In some aspects the compensation factors are based on difference in received power. Particularly, according to an embodiment the compensation factors $c1, c2, \ldots, ck, \ldots, cN$ pertain to difference in received power of the respective beam reference signals $r1, r2, \ldots, rk, \ldots, rN$ when received in the fixed beam $b0$.

In some aspects the compensation factors are based on difference in frequency location. Particularly, according to an embodiment the compensation factors $c1, c2, \ldots, ck, \ldots, cN$ pertain to difference in frequency location of the respective beam reference signals $r1, r2, \ldots, rk, \ldots, rN$. This is advantageous when different amounts of signal power are, for one and the same directional beam, received at different frequency locations (e.g. due to a frequency selective radio propagation channel between the network node 140 and the terminal device 200).

There could be different ways for the terminal device 200 to determine the compensation factors $c1, c2, \ldots, ck, \ldots, cN$.

In some aspects the signal strength is determined in terms of received power. That is, according to an embodiment the signal strength is, during the evaluating in step S108, determined in terms of received power.

In some aspects the compensation factors are determined with respect to difference in received power to the strongest reference signal. That is, according to an embodiment beam reference signal $rj$ is assumed to have highest received power of all beam reference signals $r1, r2, \ldots, rk, \ldots, rN$ as received using the fixed beam $b0$. Compensation factor $ck$ then specifies a difference in received power $dk$ between beam reference signal $rk$ and the beam reference signal $rj$ with highest received power.

There could be different ways for the terminal device 200 to apply the compensation factors. According to an embodiment the signal strength for directional beam $bk$ is compensated for by the difference in received power $dk$ being added to the received power of directional beam $bk$, for $k=1, \ldots, N$. In other examples the signal strength for directional beam $bk$ is compensated for by the difference in received power $dk$ being subtracted from the received power of directional beam $bk$, for $k=1, \ldots, N$. In yet other examples, for some directional beam the values of received power are compensated for by the difference in received power being added to the received power and for other directional beam the values of received power are compensated for by the difference in received power being subtracted from the received power. Examples will be provided below.

In some aspects the terminal device 200 has more than N directional beams. The terminal device 200 might therefore need to receive a further occurrence of the set of beam reference signals r1, r2, ..., rk, ..., rN such that one beam reference signal is received in each directional beam at the terminal device 200. Therefore, according to an embodiment the terminal device 200 is configured to perform (optional) step S106a:

S106a: The terminal device 200 receives, using a further set of directional beams bN+1, bN+2, ..., bN+k, ..., bN+N, a third occurrence of the set of beam reference signals r1, r2, ..., rk, ..., rN such that beam reference signal rk is received in directional beam bN+k, for k=1, ..., N.

Which directional beam in the set of directional beams b1, b2, ..., bk, ..., bN to use for subsequent communication with the network node 140 is then in step S108 evaluated also based on strongest received beam reference signal in the third occurrence of the set of beam reference signals r1, r2, ..., rk, ..., rN. The signal strength for directional beam bN+k is compensated for using compensation factor ck, for k=1, ..., N.

In some aspects step S106a is performed as part or step S106. Another occurrence of step S106 with yet a further set of directional beams b2N+1, b2N+2, ..., b2N+k, ..., b2N+N can be performed when the terminal device 200 has more than 2N directional beams.

There could be different ways for the terminal device 200 to act once having performed the evaluation in step S108. In some aspects the evaluating in step S108 results in the directional beam b1, b2, ..., bk, ..., bN with strongest received beam reference signal as compensated for using the compensation factors ck, for k=1, ..., N being selected for use for subsequent communication with the network node 140. The selected directional beam can then be used by the terminal device 200 when communicating with the network node 140. Hence, according to an embodiment the terminal device 200 is configured to perform (optional) step S110:

S110: The terminal device 200 communicates, using the selected directional beam, with the network node 140.

As disclosed above, there could be different triggers for the terminal device 200 to perform the beam training. In this respect, there could be different triggers for the terminal device 200 to determine when, or even if, to determine new values of the compensation factors c1, c2, ..., ck, ..., cN. In some aspects the same beam reference signals will be repeatedly transmitted from the network node 14 and it might therefore be enough for the terminal device 200 to determine values of the compensation factors once and then use these values whenever needed.

One trigger concerns data session length. According to a first example, new values of the compensation factors are determined in case the data session for the terminal device 200 becomes long. Hence, according to this first example new values of the compensation factors are determined upon expiration of timer. Particularly, according to an embodiment the terminal device 200 is configured to perform (optional) step S112a:

S112a: The terminal device 200 starts a timer when receiving the first occurrence of a set of beam reference signals r1, r2, ..., rk, ..., rN. A respective new value of the compensation factor c1, c2, ..., ck, ..., cN for at least one of the received beam reference signals r1, r2, ..., rk, ..., rN is then, according to this embodiment, determined only upon expiration of the timer.

Advantageously this enables the terminal device 200 to periodically determine new values of the compensation factors c1, c2, ..., ck, ..., cN.

There could be different examples of timers. In some examples the timer has an expiration period ranging in the interval from about 1 hour down to about 10 seconds. Particularly, according to an embodiment the timer has an expiration time of at most 1 hour, such as at most 30 minutes, preferably less than 1 minute (such as between 10 and 20 seconds).

Another trigger concerns handover. According to a second example, the terminal device 200 is handed over from the network node 140 to another network node 140. The transmission of the beam reference signals from this so-called another network node 140 might have different power settings than the transmission from the network node 140 from which the beam reference signals r1, r2, ..., rk, ..., rN were received. Hence, according to this second example new values of the compensation factors are determined upon handover of the terminal device 200 to another network node 140. Particularly, according to an embodiment the terminal device 200 is configured to perform (optional) step S112b:

S112b: The terminal device 200 participates in a handover from the network node 140 to another network node 140. A respective new value of the compensation factor c1, c2, ..., ck, ..., cN for at least one of the received beam reference signals r1, r2, ..., rk, ..., rN is then, according to this embodiment, determined only upon the terminal device 200 being handed over from the network node 140 to the so-called another network node 140.

Yet another trigger concerns transmission power. According to a third example new values of the compensation factors are determined upon the network node 140 changing transmission power. Particularly, according to an embodiment the terminal device 200 is configured to perform (optional) step S112c:

S112c: The terminal device 200 obtains an indication from the network node 140 of change in transmission power of the beam reference signals r1, r2, ..., rk, ..., rN. A respective new value of the compensation factor c1, c2, ..., ck, ..., cN for at least one of the received beam reference signals r1, r2, ..., rk, ..., rN is then, according to this embodiment, determined only upon the terminal device 200 having received the indication.

Figure 4:
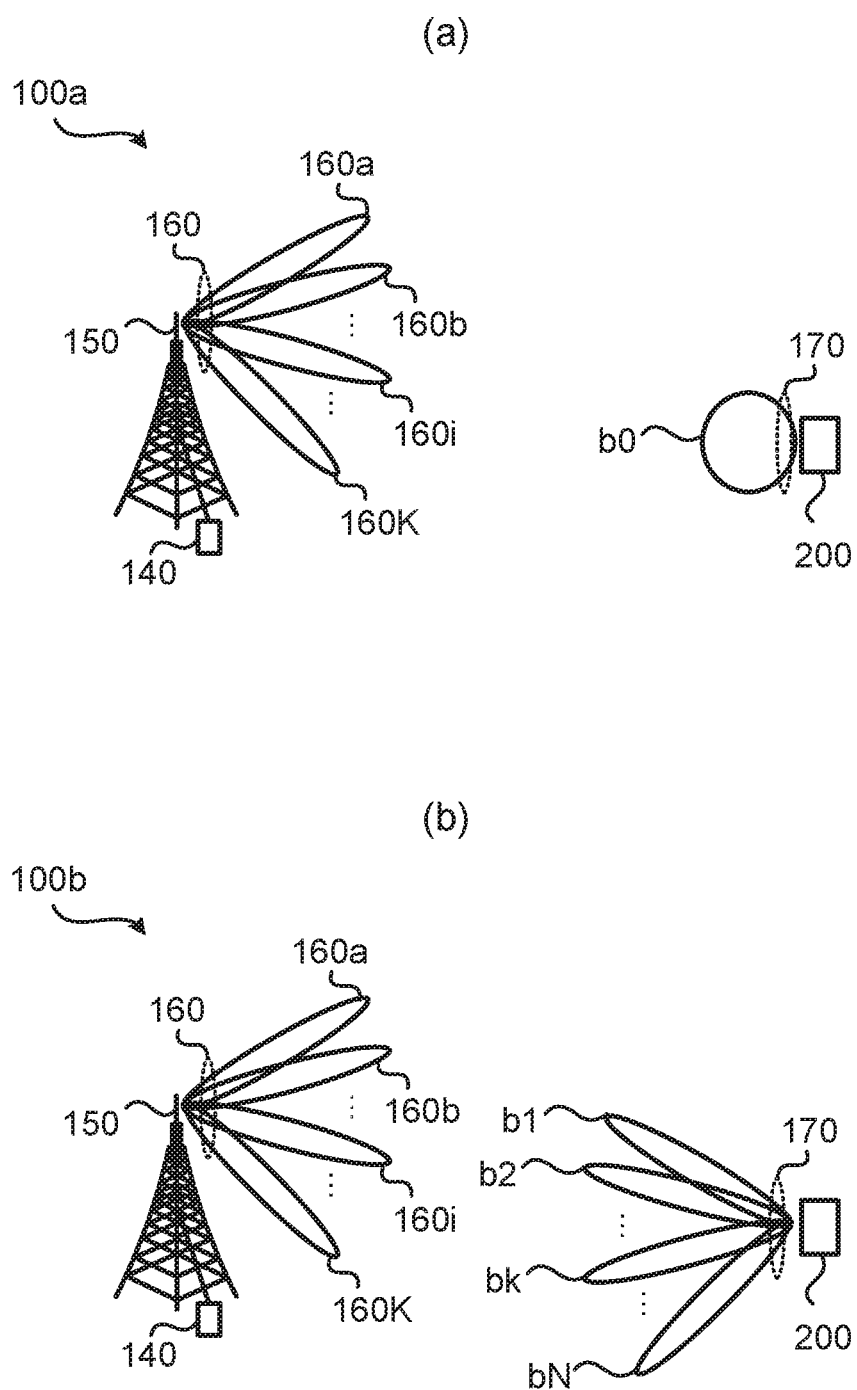
FIG. 4 schematically illustrates parts of the communications network in FIG. 2 according to an embodiment.

FIG. 4 at (a) and (b) schematically illustrate parts 100a, 100b of the communications network 100 of FIG. 2 focusing on the terminal device 200 and the network node 14 and its TRP 150.

In FIG. 4 at (a) the network node 140 transmits a first occurrence of a set of beam reference signals r1, r2, ..., rk, ..., rN in each beam of a set of directional beams 160. One SSB might be transmitted in each directional beam 160a, 160b, ... 160i, ..., 160K. The terminal device 200 receives the first occurrence of the set of beam reference signals r1, r2, ..., rk, ..., rN using a set of beams 170 defined by one single fixed beam b0.

Further, if the set of directional beams 160 consists of K directional beams, the terminal device 200 might receive the first occurrence of the set of beam reference signals K times, one in each of the K directional beams. According to an example, each directional beam comprises one SSB and each SSB comprises four beam reference signals r1, r2, ..., rk, ..., rN (thus N=4), where each beam reference signal occupies one OFDM symbol.

The terminal device 200 measures received power on the beam reference signals r1, r2, ..., rk, ..., rN at least for the best directional beam (i.e., the directional beam received with highest power) out of all directional beams 160a-160K, and determines that one of these beam reference signals r1, r2, ..., rk, ..., rN as transmitted in this best directional beam (say, beam 160i) yields the strongest received signal, such as based on RSRP measurements on the SSS of each of the SSBs.

In some examples the received power is measured per beam reference signals r1, r2, ..., rk, ..., rN only in the beam received with highest power (i.e., only for the best one of the directional beams 160a-160K). In other examples the received power is measured per beam reference signals r1, r2, ..., rk, ..., rN as an average for all the beams (i.e., for all of the directional beams 160a-160K) in which the beam reference signals r1, r2, ..., rk, ..., rN are transmitted from the network node 140.

For example, assuming again that N=4 and that the received power for the thus four OFDM symbols, when received using the same fixed beam b0, are:

Beam reference signal r1: −53 dBm, beam reference signal r2: −56 dBm, beam reference signal r3: −58 dBm and beam reference signal r4: −56 dBm.

Based on the RSRP measurements (per OFDM symbol) the terminal device 200 determines a compensation factor for the respective beam reference signals r1, r2, ..., rk, ..., rN at least for the beam received with highest signal power in order to compensate for potential differences in frequency allocation and/or output power between the different beam reference signals r1, r2, ..., rk, ..., rN within one single beam. For the subject illustrative example the following set of compensation factors can be determined in order to compensate for the differences listed above:

c1=−3 dB, c2=0 dB, c3=+2 dB, and c4=0 dB.

Another set of compensation factors to compensate for the differences that could be determined for the subject illustrative example would be:

c1=0 dB, c2=+3 dB, c3=+5 dB, and c4=+3 dB.

The compensation factors c1, c2, ..., ck, ..., cN are then added to the received signal power during a coming transmission (i.e., when the terminal device 200 receives the second occurrence, third occurrence, etc., of the set of beam reference signals r1, r2, ..., rk, ..., rN) in the best beam in the set of directional beams 160). When receiving the second occurrence of the set of beam reference signals r1, r2, ..., rk, ..., rN in the best beam in the set of directional beams 160, the terminal device 200 receives the beam reference signals in its own directional beams b1, b2, ..., bk, ..., bN (e.g. by sweeping its receiving directional beam in the set of beams 170 when analog beamforming is used) to achieve comparable received power measurements for the different directional beams b1, b2, ..., bk, ..., bN, as in FIG. 4 at (b).

Further, the terminal device 200 could be configured to, when receiving the second occurrence of the set of beam reference signals r1, r2, ..., rk, ..., rN, sweep its receive beam (i.e., to sequentially use different ones of the different directional beams b1, b2, ..., bk, ..., bN) for each directional beam 160a-160K in which the beam reference signals r1, r2, ..., rk, ..., rN are transmitted and not just the best directional beam 160i. This is especially advantageous in case the network node 140 decides to switch to another beam in the set of directional beams 160 when transmitting control signalling or data signalling and hence not use the current best directional beam 160i. If the terminal device 200 performs such beam sweeping then the terminal device 200 already knows which directional beam b1, b2, ..., bk, ..., bN to use for the new directional beam used by the network node 140. Hence the terminal device 200 can use the determined compensation factors during its beam sweep for each transmission of the beam reference signals r1, r2, ..., rk, ..., rN, regardless which directional beam 160a-160K is used by the network node 140.

Figure 5:
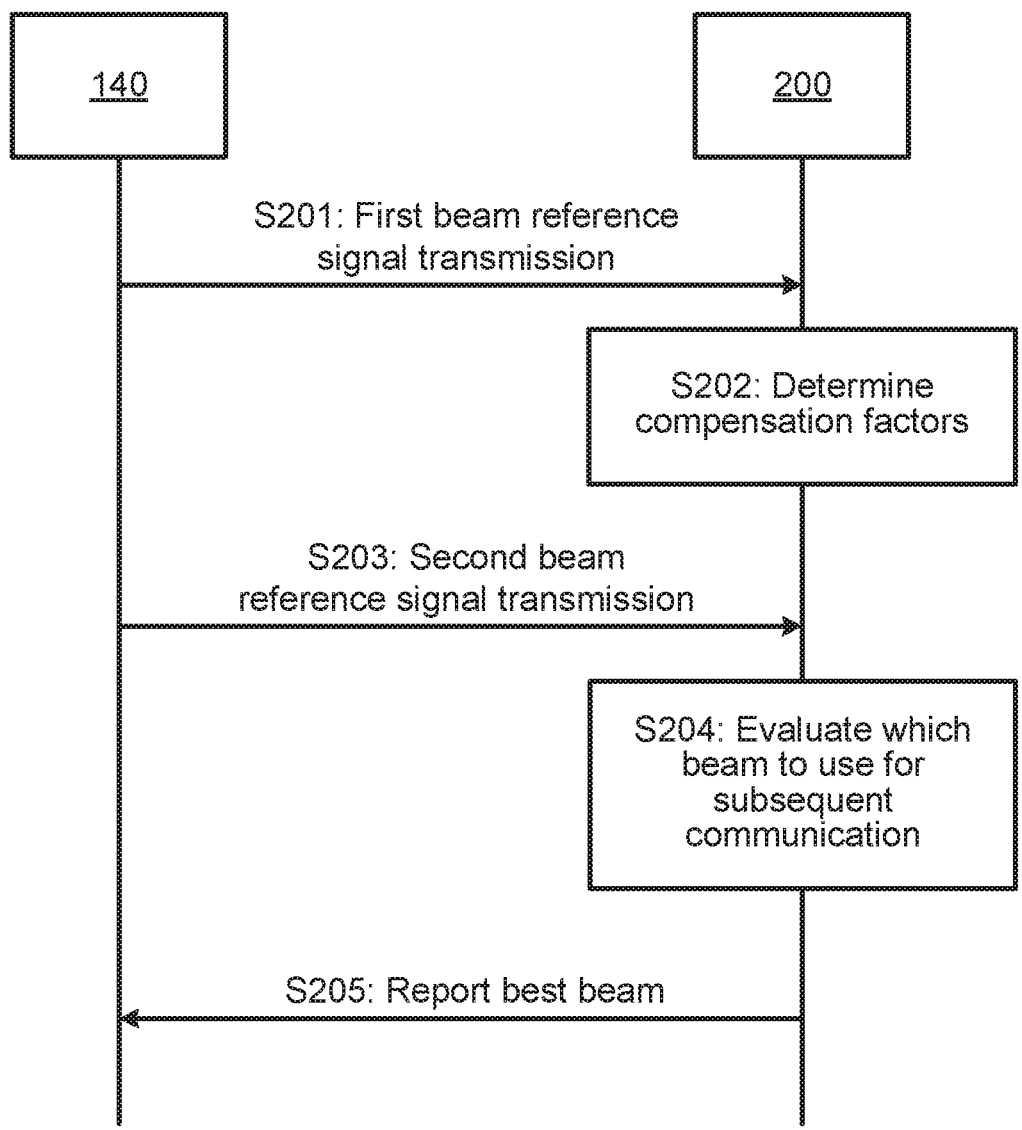
FIG. 5 is a signalling diagram according to an embodiment.

FIG. 5 is a signalling diagram of a method for beam training as performed by the terminal device 200 and the network node 140.

S201: The network node 140 transmits a first occurrence of a set of beam reference signals r1, r2, ..., rk, ..., rN in each beam of a set of directional beams. The terminal device 200 receives the beam reference signals in a fixed beam b0.

S202: The terminal device 200 determines a respective compensation factor c1, c2, ..., ck, ..., cN for at least all but one of the received beam reference signals r1, r2, ..., rk, ..., rN. The compensation factors are determined at least based on the SSB received with highest received power in step S202.

S203: The network node 140 transmits a second occurrence of a set of beam reference signals r1, r2, ..., rk, ..., rN in each beam of a set of directional beams. The terminal device 200 receives the beam reference signals using a set of directional beams b1, b2, ..., bk, ..., bN.

S204: The terminal device 200 evaluates which directional beam in the set of directional beams b1, b2, ..., bk, ..., bN to use for subsequent communication with the network node 140 by applying the compensation factors c1, c2, ..., ck, ..., cN to the measurements of the beam reference signals as received using the using a set of directional beams b1, b2, ..., bk, ..., bN.

S205: The terminal device 200 reports the best directional beam, as determined during the evaluation in step s204, back to the network node 140.

Figure 6:
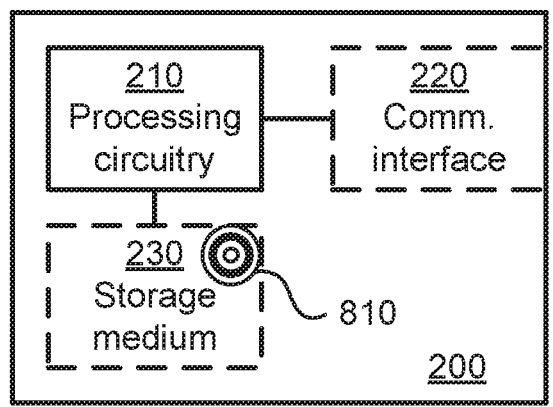
FIG. 6 is a schematic diagram showing functional units of a terminal device according to an embodiment.

FIG. 6 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform o10 the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with other entities, nodes, and devices of the communications network 100, 100a, 100b, such as the network node 140. As such the communications interface 220 may comprise one or more transmitters and receivers, comprising analogue and digital components. The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 7:
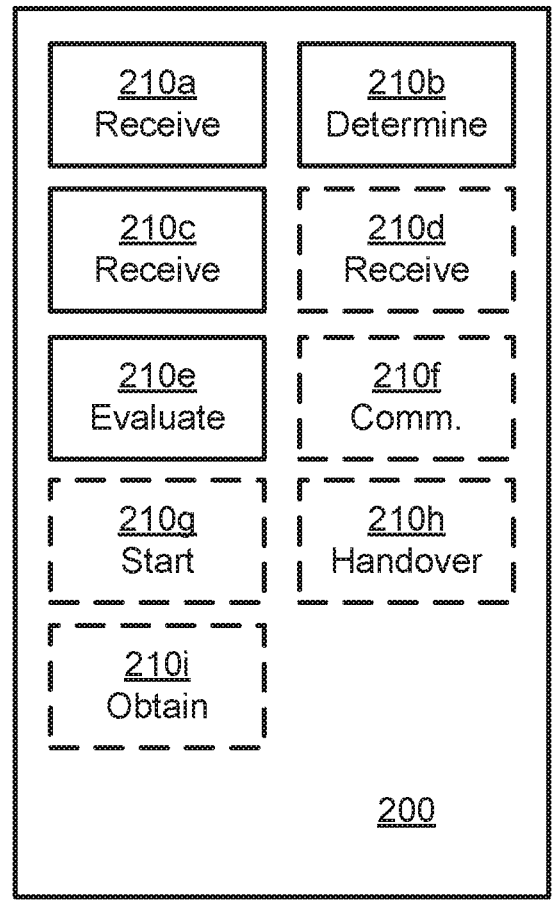
FIG. 7 is a schematic diagram showing functional modules of a terminal device according to an embodiment.

FIG. 7 schematically illustrates, in terms of a number of functional modules, the components of a terminal device 200 according to an embodiment. The terminal device 200 of FIG. 7 comprises a number of functional modules; a receive module 210a configured to perform step S102, a determine module 210b configured to perform step S104, a receive module 210c configured to perform step S106, and an evaluate module 210e configured to perform step S108. The terminal device 200 of FIG. 7 may further comprise a number of optional functional modules, such as any of a receive module 210d configured to perform step S106a, a communicate module 210f configured to perform step S110, a start module 210g configured to perform step S112a, a handover module 210h configured to perform step S112b, and an obtain module 210i configured to perform step S112c.

In general terms, each functional module 210a-210i may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with the communications interface 220 and/or the storage medium 230. The processing circuitry 210 may thus be configured to from the storage medium 230 fetch instructions as provided by a functional module 210a-210i and to execute these instructions, thereby performing any steps as disclosed herein.

The terminal device 200 may be provided as a standalone device or as a part of at least one further device. Different examples of terminal devices 200 have been disclosed above. A first portion of the instructions performed by the terminal device 200 may be executed in a first physical device, and a second portion of the of the instructions performed by the terminal device 200 may be executed in a second physical device; the herein disclosed embodiments are not limited to any particular number of physical devices on which the instructions performed by the terminal device 200 may be executed. Therefore, although a single processing circuitry 210 is illustrated in FIG. 6 the processing circuitry 210 may be distributed among a plurality of physical devices. The same applies to the functional modules 210a-210i of FIG. 7 and the computer program 820 of FIG. 8 (see below).

Figure 8:
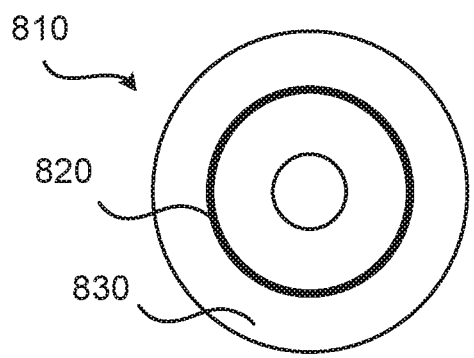
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam training, the method being performed by a terminal device, the method comprising:
receiving from a network node a first set of beam reference signals, wherein the first set of beam reference signals is received at the terminal device using a fixed receive beam;
performing a measurement on each reference signal in the received first set of beam reference signals;
based on the performed measurements, determining a compensation factor for each reference signal in a first subset of one or more beam reference signals, wherein the first subset is included in the first set;
receiving from the network node a second set of beam reference signals, wherein each signal in the second set of beam reference signals is received at the terminal device using a different one of a plurality of directional beams;
performing a measurement on each reference signal in the received second set of beam reference signals;
compensating the measurement of each reference signal in a second subset of one or more beam reference signals, wherein the second subset is included in the second set, and further wherein the compensating is based on the compensation factor determined for each reference signal in the first subset of one or more beam reference signals;
selecting from the plurality of directional beams a beam to use for subsequent communication with the network node based on the compensated measurement of each reference signal in the second subset of one or more beam reference signals.

2. The method of claim 1, wherein each beam reference signal included in the first set of beam reference signals timewise occupies one orthogonal frequency-division multiplexing (OFDM) symbol.

3. The method of claim 1, wherein the first set of beam reference signals is defined by a synchronization signal block (SSB).

4. The method of claim 1, wherein the first set of beam reference signals comprises four beam reference signals.

5. The method of claim 1, wherein the measurement on each reference signal is a measurement of reference signal received power (RSRP).

6. The method of claim 5, wherein each beam reference signal included in the first set of beam reference signals comprises a secondary synchronization signal (SSS) and wherein the RSRP is determined for the SSS.

7. The method of claim 1, wherein the compensation factors pertain to difference in received power of the beam reference signals when received in the fixed receive beam.

8. The method of claim 1, wherein the compensation factors pertain to difference in frequency location of the beam reference signals.

9. The method of claim 1, wherein the measurement on each reference signal in the received first set of beam reference signals is a measurement of received power.

10. The method of claim 9, wherein
among the first set of beam reference signals, one or more reference signals has highest received power, and
the compensation factor for each reference signal in the first subset of one or more beam reference signal specifies a difference in received power between said one or more beam reference signals having the highest received power and each reference signal in the first subset.

11. The method of claim 10, wherein the measurement of each reference signal in the received second subset of one or more beam reference signals is compensated by adding one of the specified differences in received power to the measurement of each reference signal in the received second subset of one or more beam reference signals.

12. The method of claim 1, wherein the fixed receive beam is wider than at least one of the plurality of directional beams.

13. The method of claim 1, wherein each of the plurality of directional beams has a narrower beam width than the fixed receive beam.

14. The method of claim 1, wherein the beam training is performed (i) as a part of an initial process performed by the terminal device in order to access the network node or (ii) upon the terminal device having been handed over to the network node.

15. The method of claim 1, wherein the first set of beam reference signals is periodically received by the terminal device.

16. The method of claim 1, further comprising:
starting a timer when starting to receive the first set of beam reference signals,
wherein a respective new value of the compensation factor for each reference signal in the first subset of one or more beam reference signals is determined only upon expiration of the timer.

17. The method of claim 16, wherein the timer has an expiration time of at most 1 hour.

18. The method of claim 1, further comprising:
participating in a handover from the network node to another network node,
wherein a respective new value of the compensation factor for each reference signal in the first subset of one or more beam reference signals is determined only upon the terminal device being handed over from the network node to said another network node.

19. The method of claim 1, further comprising:
obtaining an indication from the network node of change in transmission power of the first set of beam reference signals, and
wherein a respective new value of the compensation factor for each reference signal in the first subset of one or more beam reference signals is determined only upon the terminal device having received the indication.

20. The method of claim 1, wherein the first set of beam reference signals is received using analog beamforming at the terminal device.

21. The method of claim 1, the method further comprising:
communicating, using the selected directional beam, with the network node.

22. The method of claim 1, further comprising:
receiving from the network node a third set of beam reference signals, wherein each signal in the third set of beam reference signals is received at the terminal device using a beam among a set of directional beams, wherein
the selection of the beam is made further based on the strongest received beam reference signal among the third set of beam reference signals, and
signal strength corresponding to a directional beam among the set of directional beams is compensated for using a compensation factor.

23. A terminal device for beam training, the terminal device comprising processing circuitry, the processing circuitry being configured to cause the terminal device to:
receive from a network node a first set of beam reference signals, wherein the first set of beam reference signals is received at the terminal device using a fixed receive beam;
perform a measurement on each reference signal in the received first set of beam reference signals;
based on the performed measurements, determine a compensation factor for each reference signal in a first subset of one or more beam reference signals, wherein the first subset is included in the first set;
receive from the network node a second set of beam reference signals, wherein each signal in the second set of beam reference signals is received at the terminal device using a different one of a plurality of directional beams;
perform a measurement on each reference signal in the received second set of beam reference signals;
compensate the measurement of each reference signal in a second subset of one or more beam reference signals, wherein the second subset is included in the second set, and further wherein the compensating is based on the compensation factor determined for each reference signal in the first subset of one or more beam reference signals;
select from the plurality of directional beams a beam to use for subsequent communication with the network node based on the compensated measurement of each reference signal in the second subset of one or more beam reference signals.

24. A computer program product comprising a non-transitory computer readable medium storing a computer program for beam training, the computer program comprising computer code which, when run on processing circuitry of a terminal device, causes the terminal device to:

receive from a network node a first set of beam reference signals, wherein the first set of beam reference signals is received at the terminal device using a fixed receive beam;

perform a measurement on each reference signal in the received first set of beam reference signals;

based on the performed measurements, determine a compensation factor for each reference signal in a first subset of one or more beam reference signals, wherein the first subset is included in the first set;

receive from the network node a second set of beam reference signals, wherein each signal in the second set of beam reference signals is received at the terminal device using a different one of a plurality of directional beams;

perform a measurement on each reference signal in the received second set of beam reference signals;

compensate the measurement of each reference signal in a second subset of one or more beam reference signals, wherein the second subset is included in the second set, and further wherein the compensating is based on the compensation factor determined for each reference signal in the first subset of one or more beam reference signals;

select from the plurality of directional beams a beam to use for subsequent communication with the network node based on the compensated measurement of each reference signal in the second subset of one or more beam reference signals.

25. A method for beam training, the method being performed by a terminal device, the method comprising:

the terminal device using a first receive (RX) beam to receive a first beam reference signal transmitted by a base station using a first transmit (TX) beam;

the terminal device determining a first power value related to a determined power of the received first beam reference signal;

the terminal device using the first RX beam to receive a second beam reference signal transmitted by the base station using a second TX beam;

the terminal device determining a second power value related to a determined power of the received second beam reference signal;

the terminal device calculating a compensation value representing a difference between the first power value and the second power value;

the terminal device using a second RX beam to receive a third beam reference signal transmitted by the base station using the first TX beam;

the terminal device determining a third power value related to a determined power of the received third beam reference signal;

the terminal device using a third RX beam to receive a fourth beam reference signal transmitted by the base station using the second TX beam;

the terminal device determining a fourth power value related to a determined power of the received fourth beam reference signal;

the terminal device adjusting the third power value using the compensation value, thereby obtaining a compensated third power value; and the terminal device using the compensated third power value and the fourth power value to select an RX beam from a set of RX beams comprising the second RX beam and the third RX beam.

* * * * *

UNITED STATES PATENT AND TRADEMARK OFFICE
CERTIFICATE OF CORRECTION

| | | |
|---|---|---|
| PATENT NO. | : 11,005,553 B2 | Page 1 of 1 |
| APPLICATION NO. | : 16/461260 | |
| DATED | : May 11, 2021 | |
| INVENTOR(S) | : Andreas Nilsson | |

It is certified that error appears in the above-identified patent and that said Letters Patent is hereby corrected as shown below:

In the Specification

In Column 2, Line 23, delete "the TRP the TRP" and insert -- the TRP, the TRP --, therefor.

In Column 5, Line 9, delete "fifth (5G)" and insert -- fifth generation (5G) --, therefor.

In Column 5, Line 33, delete "TRP, 150." and insert -- TRP 150. --, therefor.

In Column 7, Line 59, delete "aspects" and insert -- aspect --, therefor.

In Column 7, Line 63, delete "that" and insert -- than --, therefor.

In Column 10, Line 59, delete "160b, . . . 160i," and insert -- 160b, . . . ,160i, --, therefor.

In Column 11, Line 48, delete "160)." and insert -- 160. --, therefor.

In Column 12, Line 38, delete "s204," and insert -- S204, --, therefor.

In Column 12, Line 57, delete "o10 the" and insert -- the --, therefor.

In Column 13, Line 55, delete "of the of the" and insert -- of the --, therefor.

In the Claims

In Column 15, Line 26, in Claim 10, delete "signal" and insert -- signals --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*